(12) United States Patent
Regelsberger et al.

(10) Patent No.: US 6,370,340 B1
(45) Date of Patent: Apr. 9, 2002

(54) METHOD AND APPARATUS FOR MONITORING PARAMETERS CORRESPONDING TO OPERATION OF AN ELECTROPHOTOGRAPHIC MARKING MACHINE

(75) Inventors: Matthias Regelsberger, Rochester; David E. Hockey, Brockport, both of NY (US)

(73) Assignee: Heidelberg Digital, L.L.C., Rochester, NY (US)

(*) Notice: Subject to any disclaimer, the term of this patent is extended or adjusted under 35 U.S.C. 154(b) by 0 days.

(21) Appl. No.: 09/572,524

(22) Filed: May 17, 2000

(51) Int. Cl.[7] ............................................. G03G 15/00
(52) U.S. Cl. .................................... 399/10; 399/31
(58) Field of Search ..................... 399/8, 9, 10, 31, 399/46; 340/679; 702/82, 187; 714/25, 47

(56) References Cited

U.S. PATENT DOCUMENTS

| | | |
|---|---|---|
| 4,910,625 A | 3/1990 | Albrecht et al. |
| 5,038,319 A | 8/1991 | Carter et al. |
| 5,146,269 A * | 9/1992 | Shimizu et al. ................ 399/8 |
| 5,777,896 A * | 7/1998 | Arita et al. ............. 340/679 X |
| 5,862,433 A | 1/1999 | Regelsberger et al. |
| 5,923,834 A | 7/1999 | Thieret et al. |

FOREIGN PATENT DOCUMENTS

JP 63-285413 11/1988

* cited by examiner

*Primary Examiner*—Joan Pendegrass

(57) ABSTRACT

A system for assessing the performance of an electrophotographic marking machine is provided, wherein data from several different inputs are gathered in two distinct sets having different frequencies. A high-frequency data set includes parameters typically recorded with each print made, and provide an electrophotographic history which is used in deducing the cause of malfunctions. The lower-frequency data are typically recorded at the time of each autosetup, and provide electrophotographic trend information which is used as a predictor of component and consumable lifetimes. In each data set, only data over an appropriately selected period maintained on a first-in, first-out basis. This system has the advantage of simultaneously providing an intensive recent history for tracing faults, and enabling long-term trends to be discerned without being buried in a redundant excess of data.

23 Claims, 6 Drawing Sheets

METHOD AND APPARATUS FOR MONITORING PARAMETERS CORRESPONDING TO OPERATION OF AN ELECTROPHOTOGRAPHIC MARKING MACHINE

FIELD OF THE INVENTION

This invention relates to electrophotographic marking machines, and more specifically to an apparatus and method for monitoring operating parameters of the marking machine.

BACKGROUND OF THE INVENTION

In servicing and repairing electrophotographic (EP) marking machines, it has long been observed that the accurate analysis of the root cause of a functional failure or malfunction is critical in the successful implementation of the proper repair. Accurate and quick error analysis reduces the costs for troubleshooting itself as well as the costs for replacement parts. Any tools suited to the effective and accurate troubleshooting of malfunctions will ultimately yield higher customer satisfaction.

In addition, most consumables and components are replaced in accordance with manufacturer's recommendation which is based on copy or page-count. The end-of-life for the component or consumable is thus inferred rather than measured. As the copy count does not accurately reflect power-up and power-downs of the machine as well as ambient operating conditions, maintenance based on copy or page counts is inherently unreliable.

Therefore, the need exists for monitoring the operating conditions of an electrophotographic marking machine, wherein the operating parameters correspond to actual usage of the machine. The need also exists for permitting error analysis and trend analysis.

SUMMARY OF THE INVENTION

The present invention provides a system for retaining image generation parameters and operating set points in an electrophotographic marking machine. These stored parameters can be compared to EP setpoints together with other key operating parameters as function of copy-count to allow for the evaluation of the component or consumable health. Furthermore, the measured data allow the prediction of the end-of-life point based on customer specific operating conditions such as jobstream, toner throughput, environmental conditions and others which have been known to affect the useful life of consumables and components.

With measured data available as consumables or components age with printing (e.g. developer, photoconductor), the prediction of end-of-life allows the pro-active exchange of identified consumables and components and, thus, avoids a service call before the component or consumable fails. A service call placed by the customer due to end-of-life of consumables and/or components is likely avoided, thus increasing the customer perceived reliability and customer satisfaction.

In the present invention, a logic and control unit (LCU), or a marking engine controller (MEC) cooperates with the storage of short term and long term data corresponding to different aspects of the electrophotographic process. One aspect of the invention is incorporated into embedded software to allow one to separate the trouble shooting of marking engine failures or malfunctions from the assessment of long term drifts in machine performance, both of which are important in monitoring marking engine performance.

The software is integrated with the LCU and provides for on an on-line data recording of predetermined parameters. The predetermined EP-parameters are recorded and stored for later retrieval. Two segments of memory are reserved for selected machine parameters recorded in response to electrophotographic marking for, first, short-term error analysis (for EP-history recording) and, secondly, for machine set points in response to autosetups to allow long-term trend analysis (for EP-trend recording).

The invention provides for the measurement and storage of two data sets. For short-term analysis, data corresponding to machine conditions during or associated with electrophotographic marking are gathered. In a first configuration, the data associated with the electrophotographic marking are collected at a high frequency, typically each time an electrophotographic marking is made. For long-term trend analysis, data corresponding to machine set points are gathered less frequently, typically each time an autosetup is performed. Typically, autosetup occurs each time the marking engine is powered up, and additionally at preset intervals, such as six-hour intervals, during periods of continuous operation. The autosetup can also be executed by a field engineer during a service call. While long-term data would be accessible from high-frequency measurements performed over a sufficiently long time, they would have to be extracted from a large excess of data points. With this invention, long-term trends would be observable from a manageable number of data points, while short-term errors could still be conveniently observed from high-frequency measurements. Also, since all but the most recent data are redundant, the older data can be discarded on a first-in, first-out (FIFO) basis. In practice, the last 1000 high-frequency and the last 500 low-frequency data are retained. Therefore, the high frequency data provide a record of the last 1000 frames, while the low-frequency data would typically provide a record of about the last 200 workdays. Discarding older data than necessary minimizes the demands on software and memory.

DETAILED DESCRIPTION OF THE PREFERRED EMBODIMENTS

Figure 1:
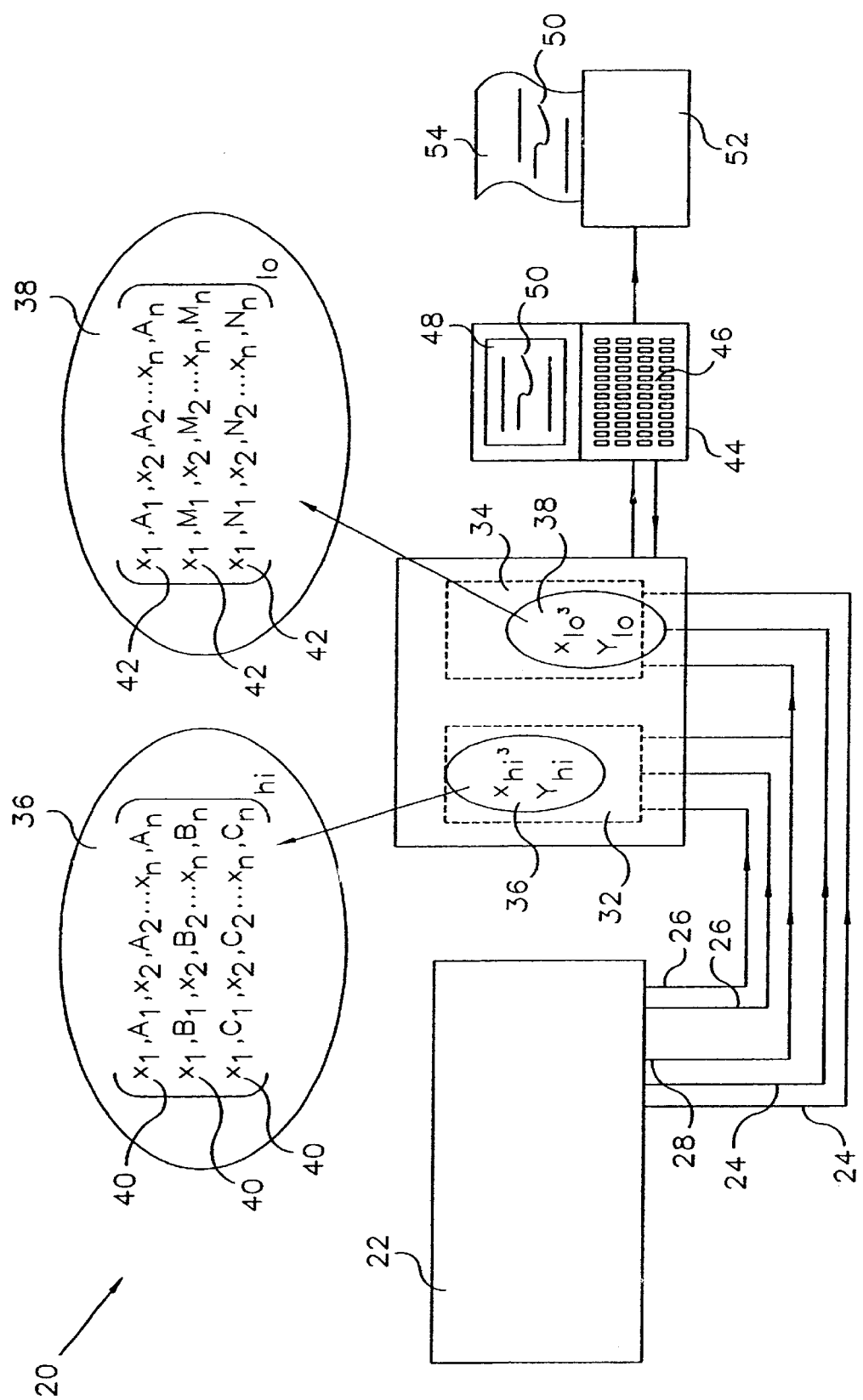
FIG. 1 is a schematic representation of a diagnositic system for an electrophotographic marking machine.

Referring to FIG. 1, the present invention includes a diagnostic system 20 for assessing operability of a machine 22.

The diagnostic system 20 includes a plurality of high-frequency inputs 24 and a plurality of low-frequency inputs 26 from the machine 22, and a process recorder connected to the inputs 24 and 26. The inputs or signals corresponding to the inputs are retained in electronic files 32 and 34, containing respectively data sets of high-frequency data 36 and low-frequency data 38. Each of the data sets 36 and 38 contains a respective plurality of subsets 40 and 42, and each subset has a series of consecutive data points from a different input. FIG. 1 shows, by way of example, two each of the high-and low-frequency inputs 24 and 26, and also one shared input 28 which provides data for both the high-frequency and low-frequency data sets 36 and 38. In practice, the total number of inputs may typically be ten or more, and several may be shared inputs such as 28. However, it is not precluded that each and every input will provide data for only one of the data sets 36 or 38.

The recorder 30 is a storage device for retaining the data sets 36 and 38. Preferably, the recorder 30 is a non-volatile memory in that it retains the data sets independent to the powered status of the machine 22. The recorder 30 is selectively or permanently connected with a computer 44 having a keyboard 46 and a display 48. On provision of an appropriate command from the keyboard 46, the files 32 and 34 can be downloaded into the computer 44, and selected data retrieved therefrom. The selected data can be displayed as a graphic image 50 on the screen 48. Optionally, the computer 44 can be connected with a printer 52, and the image 50 can be printed out as a hard copy 54.

Figure 2:
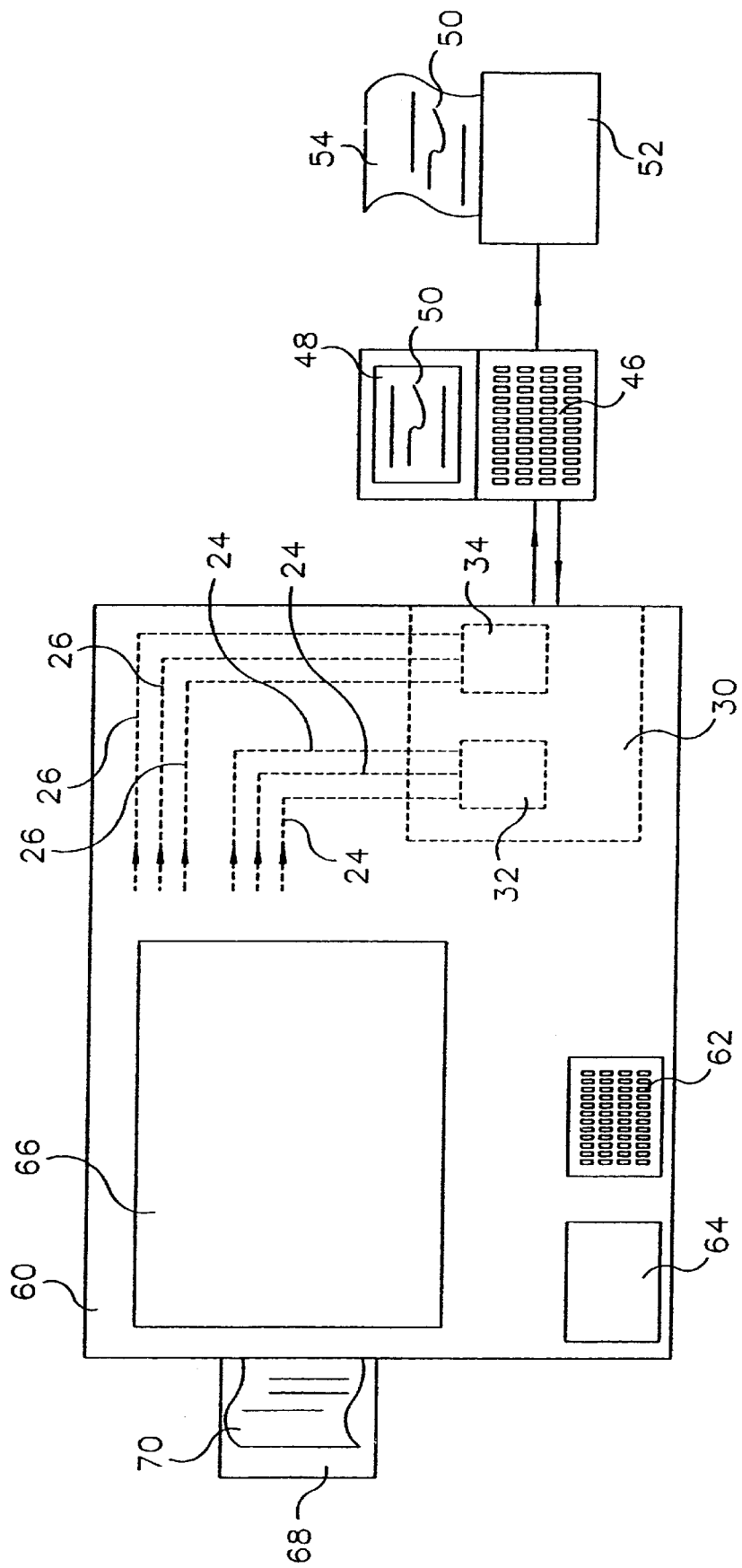
FIG. 2 is a schematic representation of an alternative configuration of a diagnositic system for an electrophotographic marking machine.

In a preferred embodiment of the invention, shown schematically in FIG. 2, the machine 22 is an electrophotographic (EP) marking machine or engine 60, such as a copier or printer. The EP machine includes the recorder 30. The EP machine 60 has a keypad 62 for entering commands, a screen 64 for prompting and displaying commands, a platen 66 for receiving an original document to be copied, and a tray 68 which can receive frames 70 printed by the copier 60. Neither an original for copying, which is placed on the platen 66, nor a platen cover are represented in the drawings. Also omitted from the drawings is any representation of an automatic feeder with which EP machines are commonly equipped. The computer 44 is any of a variety of computing devices including, but not limited to dedicated servicing devices as well as laptop computers. The computer 44 and the EP machine 60 are configured to provide operable interconnection during a service call, so that the computer operably connects to the recorder 30. The operator can download the files 32 and 34 into the computer 44 and display selected data on the screen 48 as a graphic image 50. Optionally, the computer 44 is connected to a printer 52 to generate a hard copy 54 of the data. It is understood the graphical display and hard copy generation can be done during the service call or at a later time.

Figure 3:
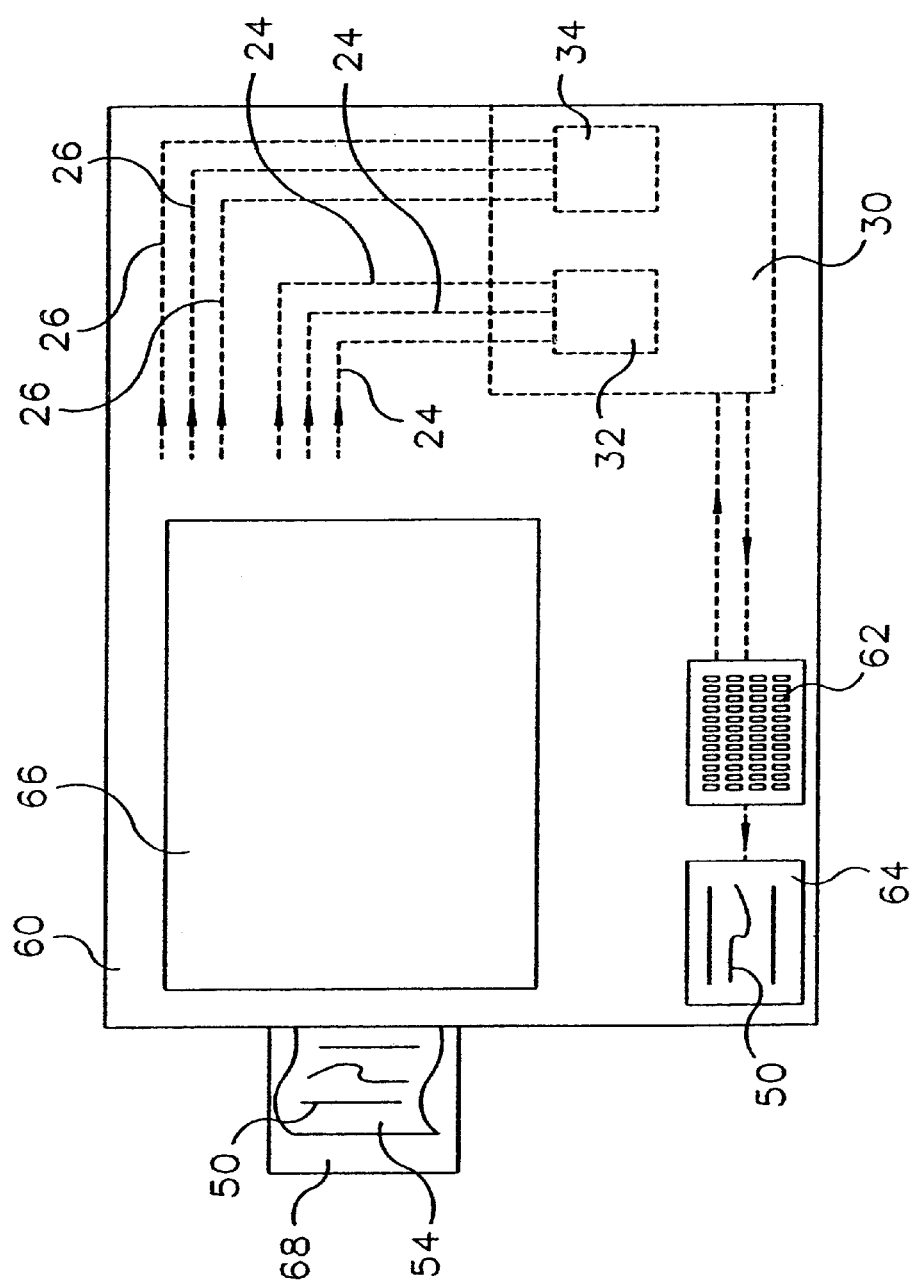
FIG. 3 is a schematic representation of a further configuration of a diagnositic system for an electrophotographic marking machine.

In another embodiment of the invention, shown schematically in FIG. 3, the EP machine 60 would host the recorder 30, while the keypad 62 and the screen 64 would not only serve to provide for the day-to-day operation of the EP machine, but would also be interactively connected with the recorder 30. The relationship between screen 62, the keypad 64 and the recorder 30 would be identical to that between the computer keyboard 46, the computer screen 48 and the recorder 30 in the preferred embodiment. This embodiment would be particularly convenient for a trained operator who would normally be stationed at the copier site.

The term EP History corresponds to the high frequency data set 36 and the term EP Trend corresponds to the low-frequency data set 38. A record of EP-History is useful for diagnosing the causes of actual malfunctions. For every printed frame, key EP-parameters are recorded characterizing the operation of all image-forming subsystems. The high-frequency data set 36 includes all selected data for 1000 frames, i.e, the data recording is structured such that all selected data of the last 1000 frames are always available upon request. Should the printer stop with e.g. a fatal error, the service engineer is able to access the last 1000 prints. Typical EP history includes values corresponding to print counter, primary charger voltage, film voltage before exposure, film voltage after exposure, toner concentration, replenisher rate and fuse temperature.

The EP Trend data provides a tool for analyzing the long-term drift of the operating conditions of the machine 22. The paramters of the low frequency (EP trend) data set may include values corresponding to print counter, date and time, film voltage before exposure, film voltage after exposure, toner concentration, toner concentration setpoint, developer life counter.

Typically, the machine 22 includes software for setup or power up of the machine. The setup software applies each time the machine 22 is powered up. In addition, as many machines will run continuously (but for maintance) the software includes an automatic, timed, execution. The powered up setup and the automatic initiated setup are termed "autosetups." With every completed autosetup, the achieved operating conditions are recorded in the low frequency data set as the EP trend data. Each occurance of the autosetup results in the recording of key EP-parameters. The EP parameters include the operating setpoints of the image-forming subsystems. Although the long term, EP trend data, (low-frequency data set 38) includes all selected data for 500 autosetups, it is understood the long term data set may include fewer or greater points. The particular number of autosetups recorded is at least partially determined by the specific machine, the operating conditions as well as desired performance parameters. Thus, in the present example, the data recording is structured such that the selected operating conditions of the last 500 autosetups are maintained at the machine. Since the autosetup is initiated each time the machine is powered up, and typically every 6 hours (of continuous operation)., approximately 200 workdays of trend data are normally included in the low frequency data set.

The following examples will provide a better understanding of the diagnostic system 20. However, assistance in trouble shooting the machine 22 accurately and effectively is not limited to the examples shown.

EXAMPLE 1

Error Analysis using Data of the Short-Term Recorder

Figure 4:
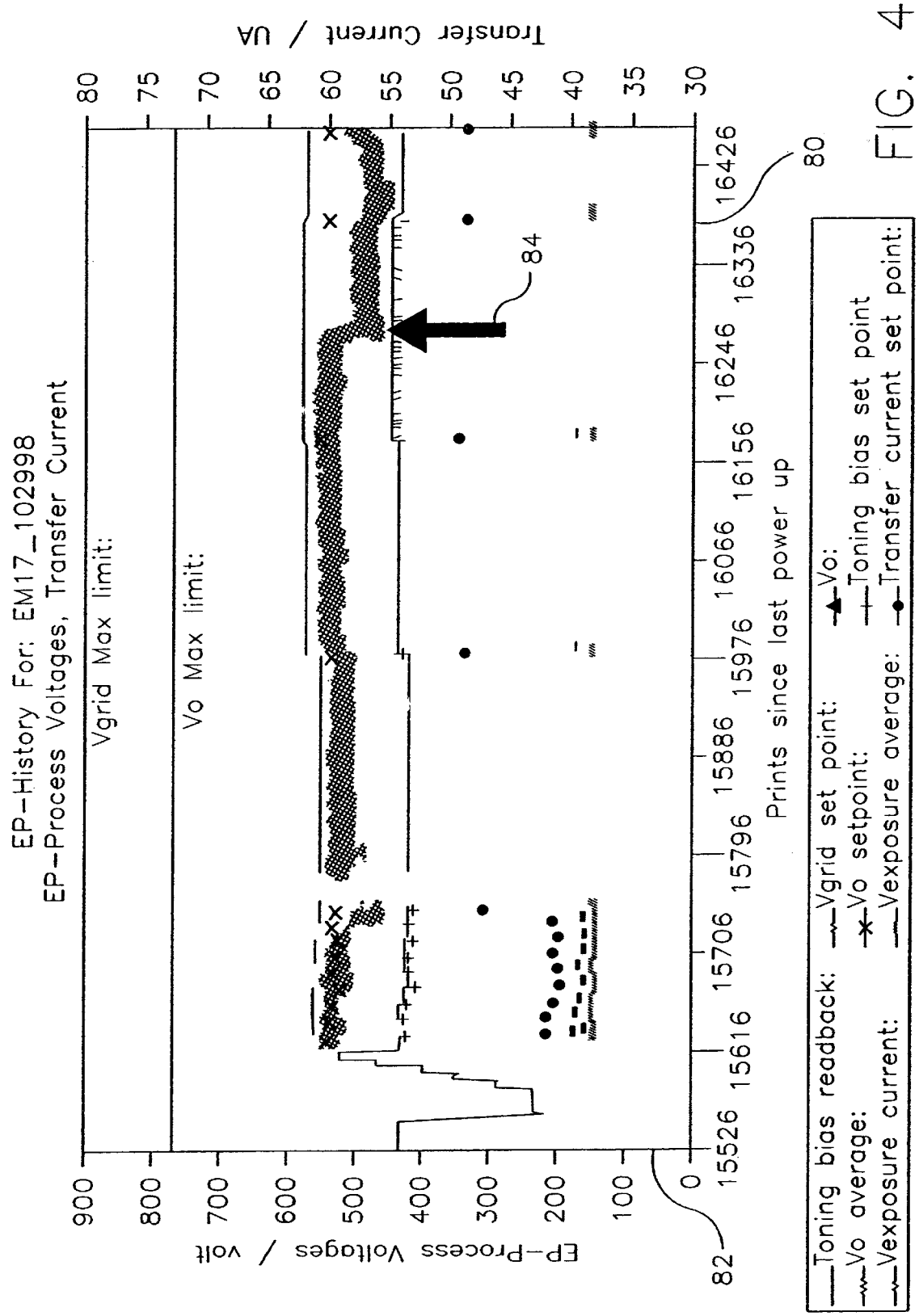
FIG. 4 is a graph of representative data.
Figure 5:
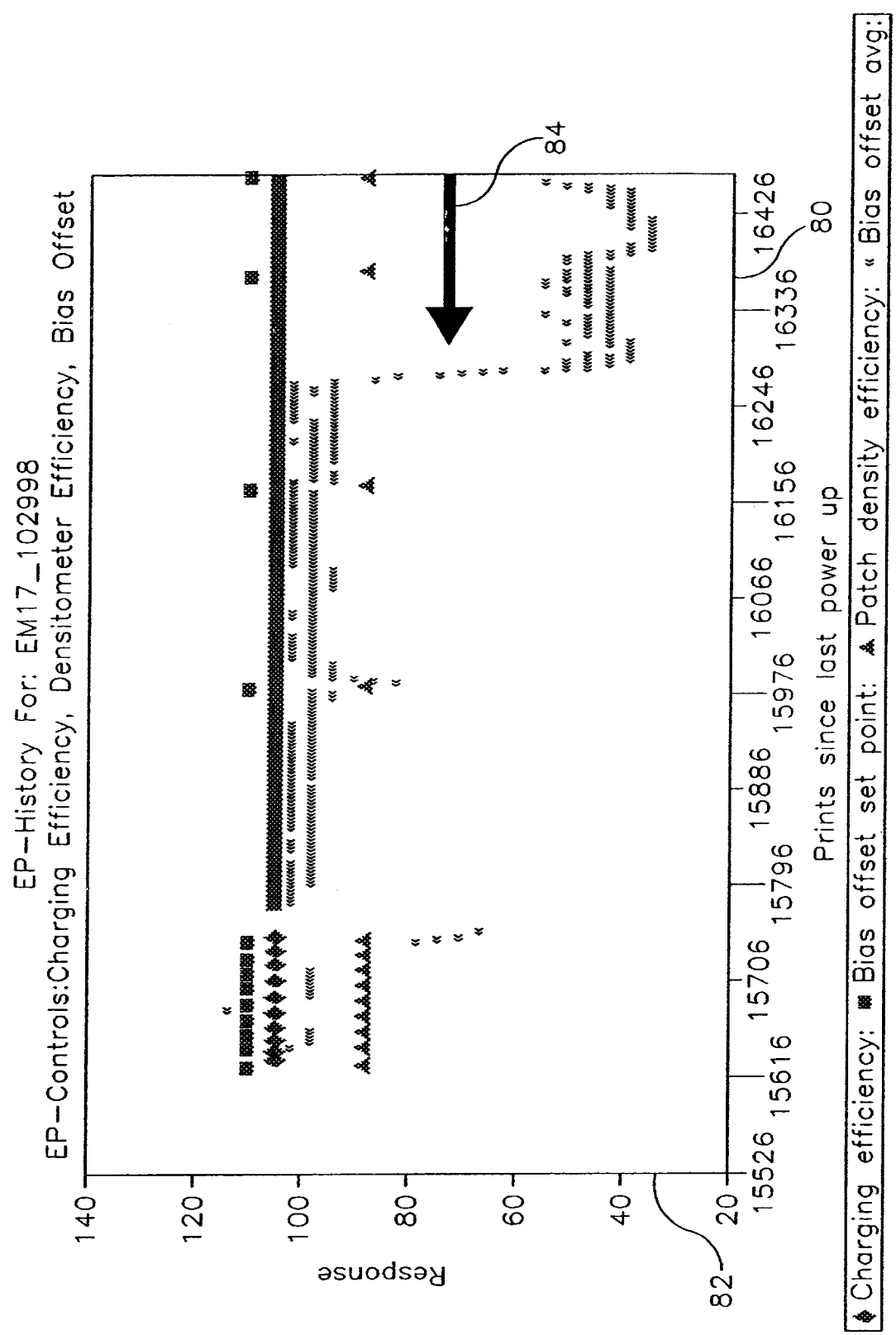
FIG. 5 is a graph of alternative representative data.

In an example depicted in FIGS. 4 and 5, the operator and the service technician of the printer observed the loss of developer at apparently random intervals. No cause or machine malfunction could be identified at the time of trouble shooting. Repeatedly, the developer was replaced. FIG. 4 shows a plot in which the x-axis 80 represents the number of frames printed since the last power-up, and the y-axis 82 represents any of a plurality of EP process voltages and also transfer current, which are parameters known in the art. In FIG. 5, the y-axis 82 represents EP controls over the same sequence of prints as those of FIG. 4. In particular, the recorded controls were charging efficiency, densitometer efficiency and bias offset, which again are terms known in the art. Analysis of the data revealed that the charger efficiency suddenly dropped causing the offset voltage $V_o-V_{bias}$ to drop from the desired 110 V to only 40V. The incident is marked by arrows 84 in FIG. 4 ($V_o$ and $V_o$ average) and FIG. 5 (bias offset average). Similarly, the efficiency of the charger suddenly increased, causing an increase in the offset voltage from the desired 110V to about 170V. A material defect in the high-voltage plastic components of the charger was identified as the root-cause providing a low impedance electrical path to ground triggered by environmental conditions. The charger was replaced and the problems were resolved.

EXAMPLE 2

Trend Analysis using Date of the Long-Term Recorder

Figure 6:
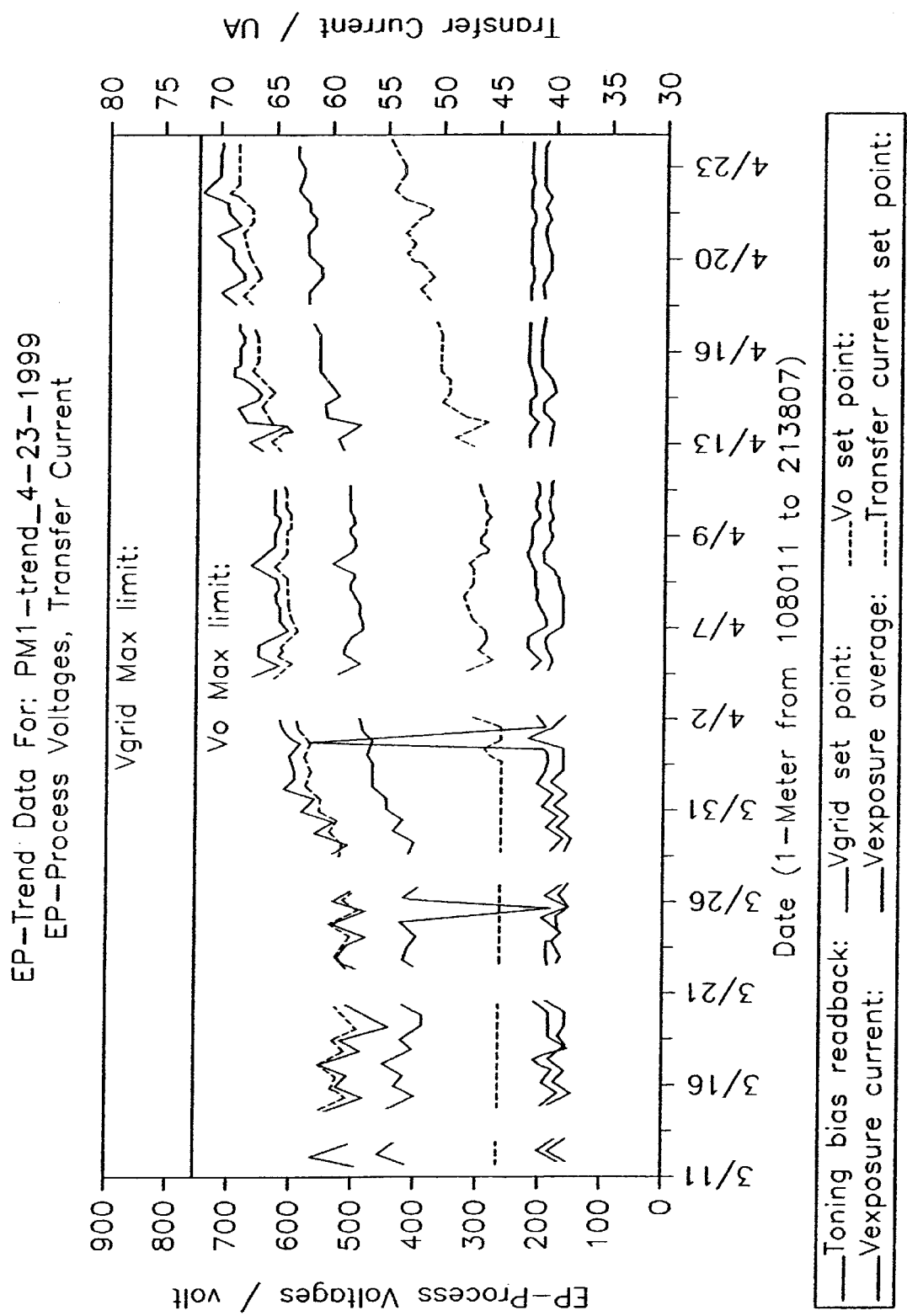
FIG. 6 is a graph of further representative data.

As components and consumables age, the image-forming subsystems degrade in their performance. Beyond certain limits, the image quality will suffer. With the long-term recorder incorporated into the MEC, trends in operating setpoints of the image-forming subsystems can be analyzed and projections for end-of-life of consumables and/or components are based on data. In FIG. 6, the x-axis 80 is marked by dates covering about six weeks. Since each autosetup event is recorded in real time, the successive events can be plotted with reference to the x-axis 80, and trends observed. The example of FIG. 6 shows setpoint data for the primary charging system, the bias voltage, the voltage after exposure and the transfer current, which are represented by the y-axis 82. All setpoints are increasing as it is expected for new developer and a new photoconductor. With a very low monthly volume of about 55K, the peak in operating points is not yet achieved. Towards the end-of-life of the developer the charge-to-mass ratio of the developer will decrease and with it the setpoints. At the manufacturer's recommended values for the setpoints, the developer in terms of charge-to-mass ratio is very likely the limiting factor in achieving the desired image quality. The developer should then be changed.

Over time, the field engineer based on his own experience and knowledge of the customer job stream will be able to access whether e.g. developer replacement should be performed while he is at the site or deferred until his next visit. In addition, since many EP-process issues are charge-to-mass (Q/m) related, the field engineer with his knowledge of the customer's jobstream can select a particular customer target indicating a Q/m-related artifact. As part of the field engineer's adaptive learning, the selected target printed at regular intervals (e.g. every service call) in conjunction with the recorded trend data will yield a customer specific profile for end-of-life of consumables and components. A customer specific profile for usage of consumables or components can further be augmented and refined by employing the use of fuzzy logic predictions rather than deterministic predictions of conventional programming tools. The combination of data recorded by the marking engine itself together with input by customer or field engineer into the maintenance database stored on the machine will after a learning period yield the customer profile.

The compositions of the high-frequency and low frequency data data sets, 36 and 38 respectively, are selected based on their role in either short-term or long-term analysis. Each sample data set 36 and 38 is recorded at a different predetermined frequency. Some data are recorded in common for both long-term and short-term analysis, albeit at the different frequencies.

It is theoretically possible that the electrophotographic marking machine may be operable for extended periods with only minimal operation. Such an extreme but most unlikely circumstance could reverse the magnitudes of the frequencies or data-gathering periods from those which would normally expected. It will therefore be understood that in the foregoing specification, the usages "short-term", "long-term", "high frequency" and "low-frequency" are chosen because they overwhelmingly represent the normal manner of using the machine.

While the present invention has been described in terms of an electrophotographic marking machine, it is understood, the invention can be employed with process lines and manufacturing. In particular coating processes, production or creation of products.

The present invention has been described in connection with certain embodiments, but it is not intended to limit the scope of the invention to the particular form set forth; on the contrary, it is intended to cover such alternatives, modifications, and equivalents as may be included within the spirit and scope of the invention as defined by the appended claims.

We claim:

1. A system for assessing operability of an electrophotographic marking machine, comprising a set of high-frequency data and a set of low-frequency data from the machine, each data set including a series of sequential data points collected from a corresponding combination of inputs, the low frequency data defined by each of a succession of autosetups.

2. The system of claim 1, wherein the high-frequency data and low-frequency data are updated concurrently.

3. The system of claim 2, wherein each series comprises up to a predetermined maximum number of data points.

4. The system of claim 1, wherein each data set is maintained on a FIFO basis.

5. The system of claim 1, further comprising a graphical representation of either data set.

6. The system of claim 1, wherein the high frequency data and the low-frequency data inputs are different.

7. The system of claim 1, wherein the high frequency data and the low-frequency data include common inputs.

8. The system of claim 1, further comprising a data recorder selected to store the high frequency data and low frequency data to be independently retrievable.

9. The system of claim 1, wherein the high frequency is defined by each of a succession of frames.

10. The system of claim 9, wherein the autosetup occurs at predetermined intervals during a period of continuous operation of the marking machine.

11. The system of claim 1, further comprising an interface selected to operably connect either data set to an independent computer.

12. The system of claim 1, further comprising a display screen configured to produce a graphic representation of either data set.

13. An electrophotographic marking machine, comprising:

(a) a short term data set including a plurality of parameters corresponding to a plurality of prior electrophotographic markings; and (b) a long term data set including a plurality of parameters corresponding to autosetups of the marking machine.

14. The electrophotographic marking machine of claim 13, further comprising a first recorder for storing the short term data set and a second recorder for storing the long term data set.

15. The electrophotographic marking machine of claim 13, wherein the short term data set includes parameters corresponding to each of a predetermined number of electrophotographic markings.

16. The electrophotographic marking machine of claim 13, wherein the long term data set includes parameters corresponding to setup conditions of the electrophotographic marking machine.

17. An electrophotographic marking machine for producing a plurality of frames, comprising:
   (a) a short term data set including a plurality of parameters corresponding to the plurality of frames; and
   (b) a long term data set including a plurality of parameters corresponding to selected conditions of the marking machine at predetermined times.

18. The electrophotographic marking machine of claim 17, wherein the predetermined times are a powering up of the machine or a selected time interval during a period of continuous operability.

19. The electrophotographic marking machine of claim 17, wherein the predetermined times are independent of the number of frames.

20. The electrophotographic marking machine of claim 17, wherein the plurality of frames are sequential.

21. A system for assessing operability of an electrophotographic marking machine, comprising a set of high-frequency data and a set of low-frequency data from the machine, each data set including a series of sequential data points collected from a corresponding combination of inputs, the high frequency is defined by each of a succession of frames and the low frequency data defined by each of a succession of autosetups.

22. The system of claim 21, wherein the autosetup occurs at predetermined intervals during a period of continuous operation of the marking machine.

23. An electrophotographic marking machine, comprising:
   (a) a short term data set including a plurality of parameters corresponding to a predetermined plurality of prior electrophotographic markings; and
   (b) a long term data set including a plurality of parameters corresponding to autosetups of the marking machine.

* * * * *